(12) United States Patent
Ogata

(10) Patent No.: US 10,710,062 B2
(45) Date of Patent: Jul. 14, 2020

(54) HONEYCOMB STRUCTURE

(71) Applicant: NGK INSULATORS, LTD., Nagoya (JP)

(72) Inventor: Takayuki Ogata, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 308 days.

(21) Appl. No.: 15/921,941

(22) Filed: Mar. 15, 2018

(65) Prior Publication Data

US 2018/0280959 A1    Oct. 4, 2018

(30) Foreign Application Priority Data

Mar. 30, 2017    (JP) .................................. 2017-068333

(51) Int. Cl.
| | | |
|---|---|---|
| *B01J 35/04* | (2006.01) | |
| *B01D 46/24* | (2006.01) | |
| *F01N 13/00* | (2010.01) | |
| *C04B 38/00* | (2006.01) | |
| *F01N 3/28* | (2006.01) | |

(52) U.S. Cl.
CPC ............ *B01J 35/04* (2013.01); *B01D 46/247* (2013.01); *B01D 46/2429* (2013.01); *B01D 46/2474* (2013.01); *C04B 38/0009* (2013.01); *F01N 3/2828* (2013.01); *F01N 13/017* (2014.06); *B01D 2046/2433* (2013.01); *B01D 2046/2481* (2013.01); *B01D 2046/2496* (2013.01); *F01N 2330/06* (2013.01); *F01N 2330/34* (2013.01); *F01N 2330/38* (2013.01)

(58) Field of Classification Search
None
See application file for complete search history.

(56) References Cited

U.S. PATENT DOCUMENTS

| 4,740,408 | A | * | 4/1988 | Mochida | ................ | B01D 46/10 |
| | | | | | | 422/179 |
| 4,767,309 | A | * | 8/1988 | Mizuno | .................... | B28B 3/269 |
| | | | | | | 264/177.11 |
| 2002/0045541 | A1 | * | 4/2002 | Koike | ...................... | B01J 35/04 |
| | | | | | | 502/251 |
| 2014/0154145 | A1 | * | 6/2014 | Aoki | .................... | B01J 35/0006 |
| | | | | | | 422/180 |
| 2017/0065919 | A1 | * | 3/2017 | Yamanishi | ............ | B28B 11/006 |

FOREIGN PATENT DOCUMENTS

JP    S62-266298 A1    11/1987

* cited by examiner

*Primary Examiner* — David Sample
*Assistant Examiner* — Elizabeth Collister
(74) *Attorney, Agent, or Firm* — Burr & Brown, PLLC

(57) ABSTRACT

A honeycomb structure includes a pillar-shaped honeycomb structure body having porous partition walls, wherein the partition walls have projecting portions, a shape of each cell is polygonal, in the polygonal cell, the projecting portions are disposed on two sides extending from a corner of the cell, respectively, the projecting portions are non-uniformly arranged, a relation of Formula (1) is satisfied, and a ratio of a total number of the corners is 2.5% or more: Formula (1): $1/(N+1)<A/L$.

5 Claims, 4 Drawing Sheets

HONEYCOMB STRUCTURE

The present application is an application based on JP-2017-068333 filed on Mar. 30, 2017 with Japan Patent Office, the entire contents of which are incorporated herein by reference.

BACKGROUND OF THE INVENTION

Field of the Invention

The present invention relates to a honeycomb structure, and more particularly, it relates to a honeycomb structure which is especially suitably utilizable as a catalyst carrier onto which an exhaust gas purifying catalyst is to be loaded.

Description of the Related Art

In recent years, awareness toward environmental problems has increased in the whole world. Consequently, in fields of technologies in which fuel is burnt to generate power, various technologies have been developed to remove toxic components such as nitrogen oxides from exhaust gases generated during the burning of the fuel. In other words, as various technologies of removing the toxic components, for example, there have been developed various technologies of removing toxic components such as nitrogen oxides from exhaust gases to be emitted from car engines. When the toxic components in the exhaust gases are removed, it is general to cause a chemical reaction in such a toxic component by use of a catalyst, thereby changing the component to another comparatively harmless component. Furthermore, as a catalyst carrier onto which an exhaust gas purifying catalyst is to be loaded, a honeycomb structure is used.

Heretofore, as this honeycomb structure, there has been suggested a honeycomb structure including a honeycomb structure body having porous partition walls which define a plurality of cells to form through channels for a fluid. As the honeycomb structure, for the purpose of increasing a geometric surface area of partition walls, there has been suggested a honeycomb structure including fins which project inwardly from the partition walls (e.g., see Patent Document 1).

[Patent Document 1] JP-A-S62-266298

SUMMARY OF THE INVENTION

In such a honeycomb structure as disclosed in Patent Document 1, a geometric surface area of partition walls can be increased by fins disposed on the partition walls. However, in the honeycomb structure of Patent Document 1, stagnation is likely to occur in a flow of an exhaust gas in a space between two fins adjacent to each other, and the stagnation is a factor for deterioration of contact properties of a catalyst with the exhaust gas especially when a flow rate is high (specifically, when a space velocity is about 8300 (1/hour) or more).

Particularly, in such a honeycomb structure as in Patent Document 1, it is preferable that the same number of the fins are disposed on respective sides constituting a cell. However, when the same number of the fins are uniformly disposed on each of the sides as in the honeycomb structure of Patent Document 1, the stagnation is remarkably likely to occur in the flow of the exhaust gas, and there has been the problem that it is not possible to inhibit deterioration of a purification performance when the flow rate is large (at the high flow rate).

The present invention has been developed in view of such problems of conventional technologies. According to the present invention, there is provided a honeycomb structure which is especially suitably utilizable as a catalyst carrier onto which an exhaust gas purifying catalyst is to be loaded. In particular, there is provided the honeycomb structure in which stagnation is hard to occur in a flow of an exhaust gas in cells and improvement of a purification performance is expected when the honeycomb structure is utilized as the catalyst carrier.

According to the present invention, there is provided a honeycomb structure as follows.

[1] A honeycomb structure including a pillar-shaped honeycomb structure body having porous partition walls arranged to define a plurality of cells extending from a first end face to a second end face to form through channels for a fluid, and a circumferential wall disposed to surround the partition walls, wherein the partition walls have projecting portions projecting to extend into the cells and arranged continuously in an extending direction of the cells, in a cross section perpendicular to an extending direction of the cells, a shape of each cell is polygonal, in the polygonal cell, the projecting portions are disposed on two sides extending from a corner of the cell, respectively, the projecting portion which is disposed on the side having a shorter distance from the corner to the projecting portion in the two sides extending from the corner and which is present at a position closest to the corner is defined as a first projecting portion, the projecting portion which is disposed on the side having a longer distance from the corner to the projecting portion in the two sides extending from the corner and which is present at a position closest to the corner is defined as a second projecting portion, the projecting portions are non-uniformly arranged on the two sides extending from the corner, a length of the side on which the second projecting portion is disposed is defined as L, a distance from the corner to a bottom central position of the second projecting portion is defined as A, the number of the projecting portions disposed on the side on which the second projecting portion is disposed is defined as N, the L, A and N satisfy a relation of Formula (1), and a ratio of a total number of the corners constituted to satisfy the relation of Formula (1) to a total number of the corners of all the cells in the honeycomb structure body is 2.5% or more:

$$1/(N+1) < A/L. \qquad \text{Formula (1)}$$

[2] The honeycomb structure according to the above [1], wherein in the polygonal cell, at least two corners constituted to satisfy the relation of Formula (1) are present.

[3] The honeycomb structure according to the above [1] or [2], wherein the cells of 10% or more of the plurality of cells have the corners constituted to satisfy the relation of Formula (1).

[4] The honeycomb structure according to any one of the above [1] to [3], wherein the number of the projecting portions to be disposed per side constituting a peripheral edge of the cell is 3 or less.

[5] The honeycomb structure according to any one of the above [1] to [4], wherein the projecting portions are disposed in the whole region of the honeycomb structure body.

A honeycomb structure of the present invention has projecting portions arranged to project into cells, and hence, a geometric surface area of partition walls can be increased by the projecting portions. Particularly in the honeycomb structure of the present invention, stagnation is hard to occur in a flow of an exhaust gas in peripheries of corners of the cells, and improvement of a purification performance is achievable when the honeycomb structure is utilized as a catalyst carrier.

DESCRIPTION OF THE PREFERRED EMBODIMENTS

Hereinafter, description will specifically be made as to embodiments of the present invention with reference to the drawings. The present invention is not limited to the following embodiments. It should be understood that the following embodiments to which changes, improvements and the like are suitably added on the basis of ordinary knowledge of a person skilled in the art without departing from the gist of the present invention also fall in the scope of the present invention.

Figure 1:
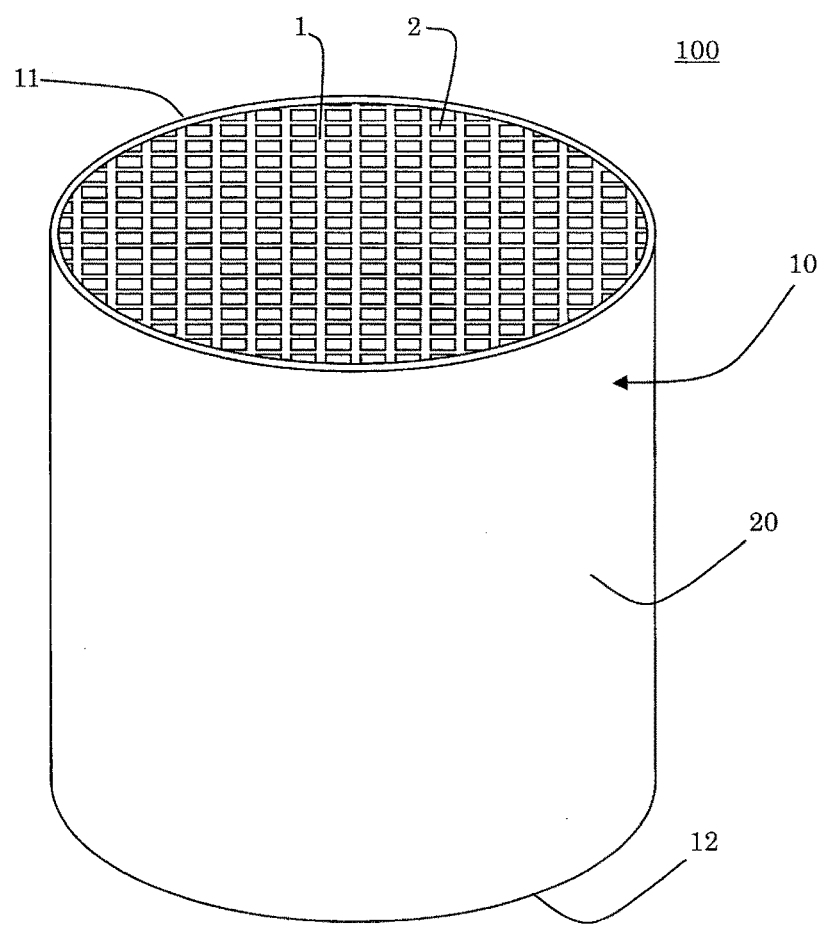
FIG. 1 is a perspective view schematically showing an embodiment of a honeycomb structure of the present invention.
Figure 2:
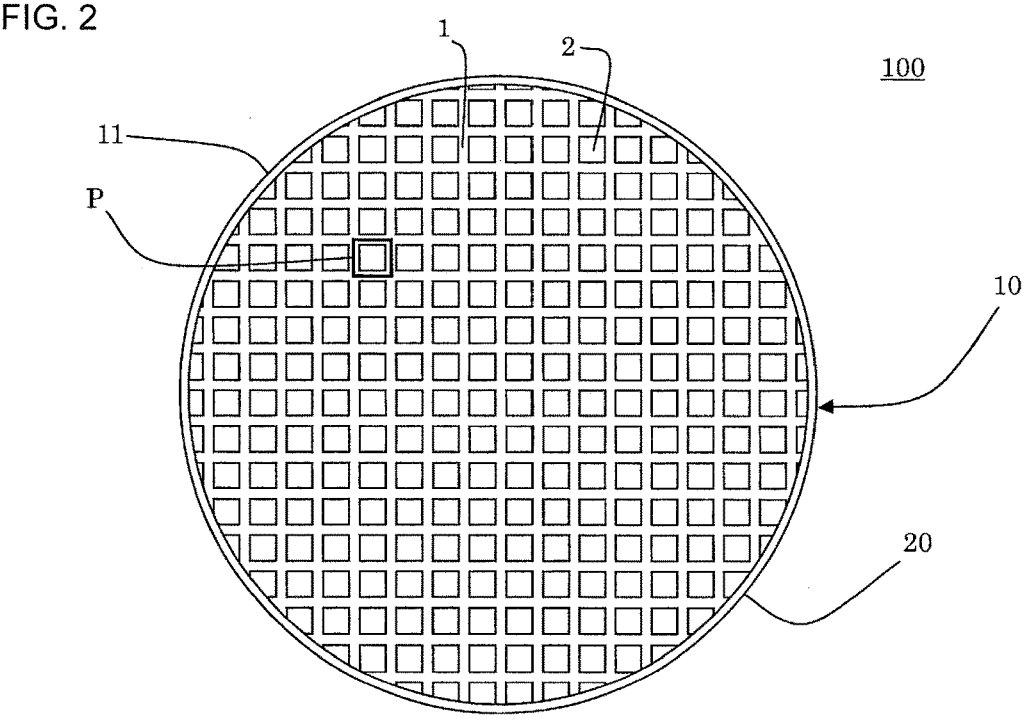
FIG. 2 is a plan view schematically showing an inflow end face of the embodiment of the honeycomb structure of the present invention.
Figure 3:
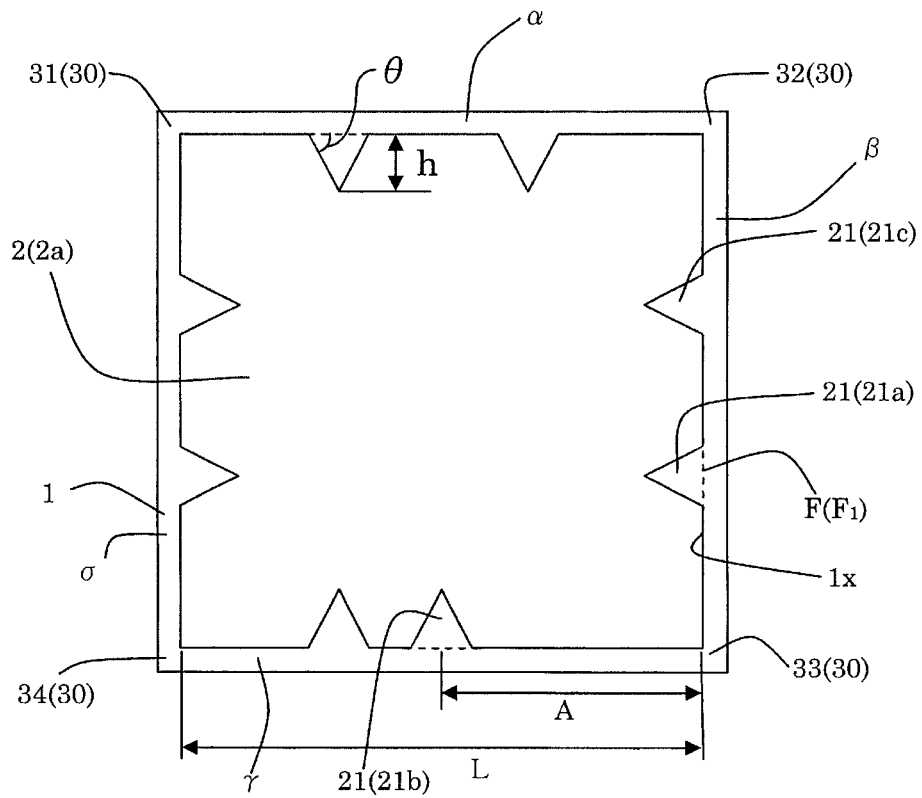
FIG. 3 is a plan view schematically showing an enlarged part (a region P) of an inflow end face shown in FIG. 2.

(1) Honeycomb Structure:

An embodiment of a honeycomb structure of the present invention is a honeycomb structure 100 shown in FIG. 1 to FIG. 3. The honeycomb structure 100 includes a pillar-shaped honeycomb structure body 10. The honeycomb structure body 10 has porous partition walls 1 arranged to define a plurality of cells 2 extending from a first end face 11 to a second end face 12 to form through channels for a fluid, and a circumferential wall 20 disposed to surround the partition walls 1. The partition walls 1 have projecting portions 21 projecting to extend into the cells 2 and arranged continuously in an extending direction of the cells 2. In a cross section perpendicular to an extending direction of the cells 2, a shape of each cell 2 is polygonal.

In the polygonal cell 2, the projecting portions 21 are disposed on two sides extending from a corner 30 of the cell 2, respectively. Furthermore, the projecting portions 21 are non-uniformly arranged on the two sides extending from the corner 30. Here, the projecting portion 21 which is disposed on the side having a shorter distance from the corner 30 to the projecting portion 21 in the two sides extending from the corner 30 and which is present at a position closest to the corner 30 is defined as a first projecting portion 21a. Additionally, the projecting portion 21 which is disposed on the side having a longer distance from the corner 30 to the projecting portion 21 in the two sides extending from the corner 30 and which is present at a position closest to the corner 30 is defined as a second projecting portion 21b. At this time, a length of the side on which the second projecting portion 21b is disposed is defined as L, a distance from the corner 30 to a bottom central position of the second projecting portion 21b is defined as A, and the number of the projecting portions 21 disposed on the side on which the second projecting portion 21b is disposed is defined as N. In this case, according to the honeycomb structure 100, the above L, A and N satisfy a relation of Formula (1) mentioned below. Furthermore, in the honeycomb structure 100, a ratio of "a total number of the corners 30 constituted to satisfy the relation of Formula (1)" to "a total number of the corners 30 of all the cells 2 in the honeycomb structure body 10" is 2.5% or more. Hereinafter, the above-mentioned cell having the corner 30 will occasionally be referred to as "a specific cell".

$$1/(N+1) < A/L \qquad \text{Formula (1)}$$

The honeycomb structure 100 has the projecting portions 21 disposed to project into the cells 2, and hence, it is possible to increase a geometric surface area of the partition walls 1.

Figure 8:
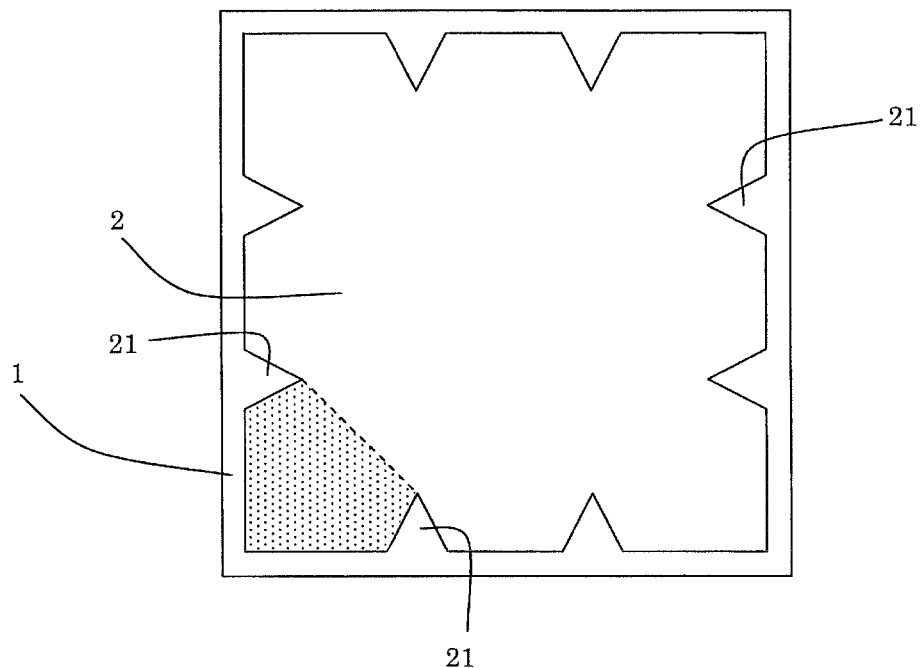
FIG. 8 is a plan view schematically showing an enlarged part of an inflow end face in a conventional honeycomb structure in which fins are disposed.

Especially, in the honeycomb structure 100, stagnation is hard to occur in a flow of an exhaust gas, and improvement of a purification performance when the honeycomb structure is utilized as a catalyst carrier is achievable. On the other hand, in a conventional honeycomb structure in which fins are disposed, the fins are arranged at equal intervals on respective sides. In this case, the stagnation is likely to occur in the flow of the exhaust gas in a space between two projecting portions 21 adjacent to each other (e.g., a corner portion as in a dotted region shown in FIG. 8), and the stagnation is a factor for deterioration of contact properties between a catalyst and the exhaust gas especially when a flow rate of the exhaust gas is large (at a high flow rate). It is to be noted that the high flow rate specifically indicates a space velocity of about 8300 (1/hour) or more. However, the honeycomb structure 100 includes the specific cells 2a, and hence, the stagnation is hard to occur in the flow of the exhaust gas even at the high flow rate as described above. As a result, in the honeycomb structure 100 onto which the catalyst is loaded, the improvement of the purification performance is achievable.

(1-1) Partition Wall:

In the honeycomb structure 100, the partition walls 1 have the projecting portions 21 as described above. Consequently, when the catalyst is loaded onto the honeycomb structure 100, by the increase amount of the area of the projecting portions 21 a catalyst loading area of the honeycomb structure 100 in which the projecting portions 21 are disposed is larger than that of a honeycomb structure in which the projecting portions 21 are not disposed. As a result, contact properties of the catalyst with the exhaust gas improve, and the purification performance of the exhaust gas improves.

There are not any special restrictions on a shape of the projecting portion 21 in the cross section perpendicular to the cell extending direction. Examples of the shape of the projecting portion 21 in the cross section perpendicular to the cell extending direction include polygonal shapes such as a triangular shape and a quadrangular shape, and a semicircular shape. Among these examples, the triangular shape is preferable. In the triangular shape, it is possible to inhibit increase of pressure loss more than in another shape, while acquiring the catalyst loading area (to the same degree as in the other shape).

It is preferable that in the cross section perpendicular to the cell extending direction, an angle of a root of the projecting portion 21 is from 40 to 70°. When the above angle is in the above range and the surfaces of the partition walls are coated with the catalyst (i.e., during catalyst coating), the catalyst is hard to thickly accumulate in the roots of the projecting portions. Therefore, a surface area of the surfaces of the partition walls which are coated with the catalyst (i.e., after the catalyst coating) can increase, and as a result, the purification performance of the exhaust gas improves. When the angle is less than the above lower limit and when heights of the projecting portions are adjusted to be the same while changing their angles, a volume of the projecting portions increases. Therefore, a heat capacity of the honeycomb structure increases, much time is therefore required until the catalyst reaches its activation temperature, and there is the fear that the purification performance of the exhaust gas deteriorates. When the angle is in excess of the above upper limit, there is the fear that a lot of catalyst accumulates in the roots of the projecting portions during the catalyst coating. That is, there is the tendency that a thick layer of the catalyst is formed in the roots of the projecting portions. Therefore, the catalyst of a lower layer portion of this catalyst layer (the portion closer to the partition walls) is hard to come in contact with the exhaust gas, and hence, there is the fear that the catalyst is not effectively used. It is to be noted that the angle of each projecting portion is measured as follows. Initially, there is obtained "a height h of the projecting portion" which is the shortest distance from the highest position of the projecting portion to a bottom side F. Then, a straight line parallel to the bottom side F is drawn at a position of ½ of "the height h of the projecting portion", and an intersection point K (not shown) of this straight line with each of sides (side surfaces) of a triangle excluding the bottom side F is obtained. Afterward, a tangent line to the side surface at the intersection point K is drawn, and an angle formed by the tangent line and the bottom side F is obtained as an angle θ. It is to be noted that the angle of the projecting portion is an acute angle in the angles formed by the surface of the partition wall and the side surface of the projecting portion.

It is preferable that a ratio of the height of the projecting portion 21 to a hydraulic diameter of the cell is from 4 to 40%. The heights of the respective projecting portions may be the same or different. Furthermore, the hydraulic diameter of the cell is a value calculated by 4×(a sectional area)/(a peripheral length) on the basis of the sectional area and peripheral length of each cell. The sectional area of the cell indicates an area of a shape (a sectional shape) of the cell which appears in a cross section of the honeycomb structure which is vertical to a central axis direction, and the peripheral length of the cell indicates a length of a periphery of the sectional shape of the cell (a length of a closed line which surrounds the cross section).

It is to be noted that as to a position, a shape, a height, an angle and the like of the projecting portion, an optional specific cell is observed with an image measuring instrument, and confirmed in the cross section perpendicular to the cell extending direction. Additionally, for example, when the cell has a quadrangular sectional shape, a side positioned on an upper side in a screen of the image measuring instrument is defined as a first side α, a side positioned on a right side is defined as a second side β, a side positioned on a lower side is defined as a third side γ, and a side positioned on a left side is defined as a fourth side σ (see FIG. 3). It is to be noted that an example of the image measuring instrument can include "a compact CNC image measuring system Quick Vision Elf QV ELF" manufactured by Mitutoyo Corporation.

It is preferable that the projecting portions 21 are disposed in the whole region of the honeycomb structure body. When the projecting portions are disposed in this manner, the purification performance of the exhaust gas improves. "The whole region of the honeycomb structure body" means the whole region from the first end face to the second end face of the honeycomb structure body. That is, it is meant that the projecting portion is continuous from the first end face to the second end face without being interrupted in its middle.

There are not any special restrictions on the number of the projecting portions 21, and an optional number of the projecting portions may be disposed on the respective sides. The number of the projecting portions may be the same or different on the sides. However, it is preferable that the number of the projecting portions is the same on the sides. In this case, an erosion resistance is maintained. That is, when the number of the projecting portions varies with each side, there is the fear that strength of the partition walls deteriorates on the side in which the number of the projecting portions is small. When the number of the projecting portions is the same on the sides as described above, it is possible to prevent the deterioration of the strength of the partition walls.

Specifically, it is preferable that the number of the projecting portions 21 to be disposed on each side is 3 or less. That is, it is preferable that the number of the projecting portions to be disposed per side constituting a peripheral edge of the cell is 3 or less. In this case, the exhaust gas further suitably flows through a space between the projecting portions adjacent to each other, the stagnation is hard to occur in the flow of the exhaust gas, and this number is effective from a viewpoint of improving the purification performance. Specifically, when the number of the projecting portions 21 on each side is 4 or more, the space between the adjacent projecting portions is excessively small, and there is the tendency that the pressure loss increases.

Figure 5:
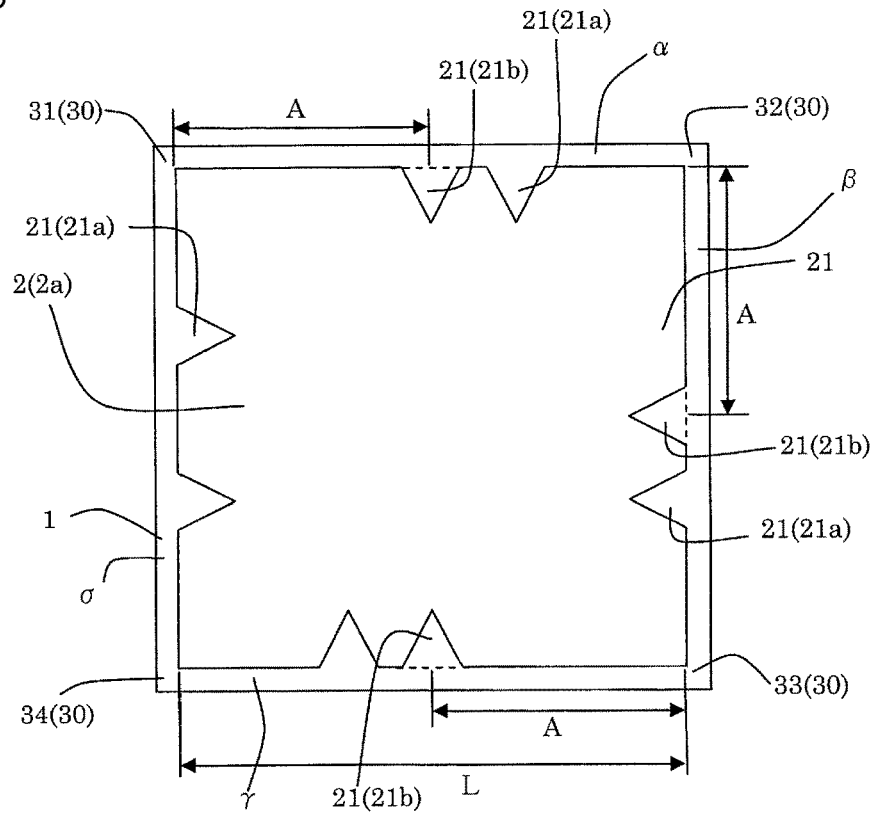
FIG. 5 is a plan view schematically showing an enlarged part of an inflow end face in still another embodiment of the honeycomb structure of the present invention.
Figure 6:
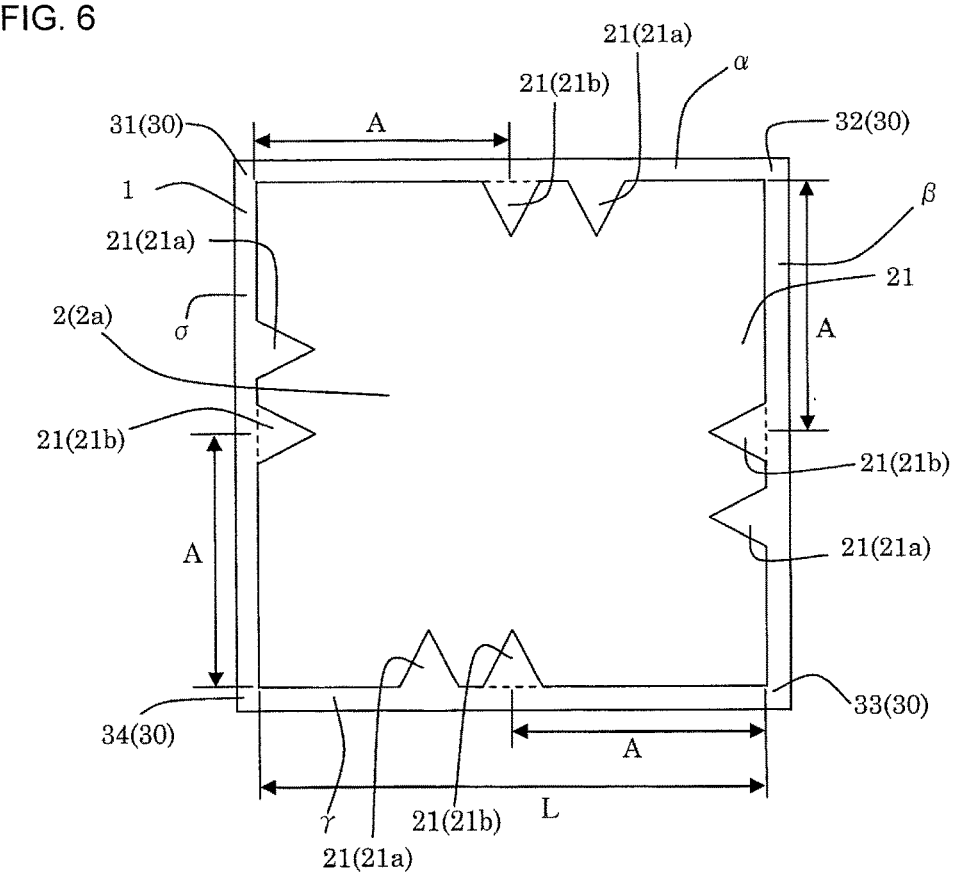
FIG. 6 is a plan view schematically showing an enlarged part of an inflow end face in a further embodiment of the honeycomb structure of the present invention.
Figure 7:
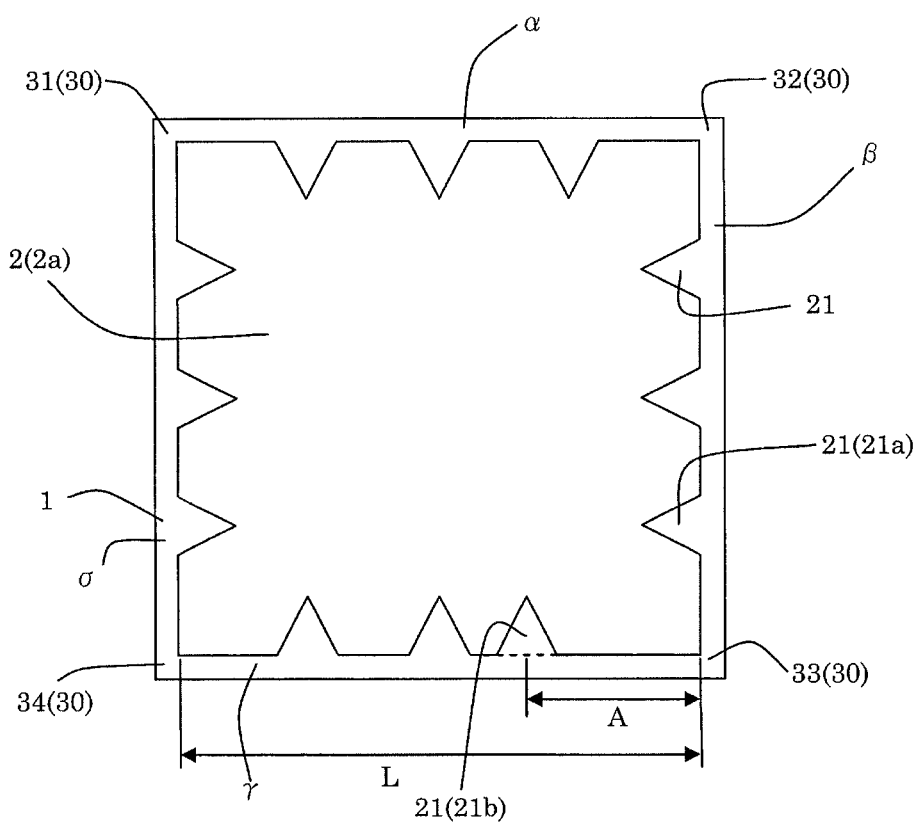
FIG. 7 is a plan view schematically showing an enlarged part of an inflow end face in a still further embodiment of the honeycomb structure of the present invention.

FIG. 3 to FIG. 6 show an example where the number of the projecting portions 21 to be disposed on each side is 2, and FIG. 7 shows an example where the number of the projecting portions 21 to be disposed on each side is 3. In FIG. 3 to FIG. 7, the number of the projecting portions to be disposed on each side is the same.

There are not any special restrictions on the position of the projecting portion 21, as long as there is satisfied the condition that "the projecting portions are non-uniformly arranged on the two sides extending from the corner". It is to be noted that "the position of the projecting portion" is the bottom central position of the projecting portion.

When "the projecting portions are non-uniformly arranged on the two sides extending from the corner", it is indicated that the first projecting portion 21a and the second projecting portion 21b which satisfy the above predetermined conditions are disposed, respectively, and the second projecting portion 21b satisfies a relation of Formula (1): $1/(N+1) < A/L$. It is to be noted that as described above, "A" in Formula (1) is a distance from the corner to a bottom central position of the second projecting portion as described above. Furthermore, this "bottom central position" means a midpoint between a right intersection point and a left intersection point in a bottom of the projecting portion in the cross section perpendicular to the cell extending direction. The right intersection point is the intersection point of the surface of the partition wall with one side surface of the projecting portion in the cross section perpendicular to the cell extending direction, and the left intersection point is the intersection point of the surface of the partition wall with the other side surface of the projecting portion.

Here, in the two sides extending from the corner 30, the projecting portions 21 other than the first projecting portion 21a and the second projecting portion 21b do not have to satisfy the relation of Formula (1). Specifically, FIG. 3 shows an example where there are the first projecting portion 21a disposed on the second side β and the second projecting portion 21b disposed on the third side γ, and the second projecting portion 21b satisfies the relation of Formula (1): $1/(N+1)<A/L$. On the other hand, in FIG. 3, a projecting portion 21c other than the first projecting portion 21a disposed on the second side β is disposed at a position to divide the second side β into three equal parts. Furthermore, a projecting portion 21c other than the second projecting portion 21b disposed on the third side γ is disposed at a position to divide the third side γ into three equal parts. In this way, the projecting portions 21c other than the first projecting portion 21a and the second projecting portion 21b can be disposed at an optional position.

It is preferable that at least two corners constituted to satisfy the relation of Formula (1) are present in the polygonal cell. When the at least two corners are present in the cell in this way, the stagnation is hard to occur in the flow of the exhaust gas, and the purification performance after the catalyst is loaded can further improve.

Figure 4:
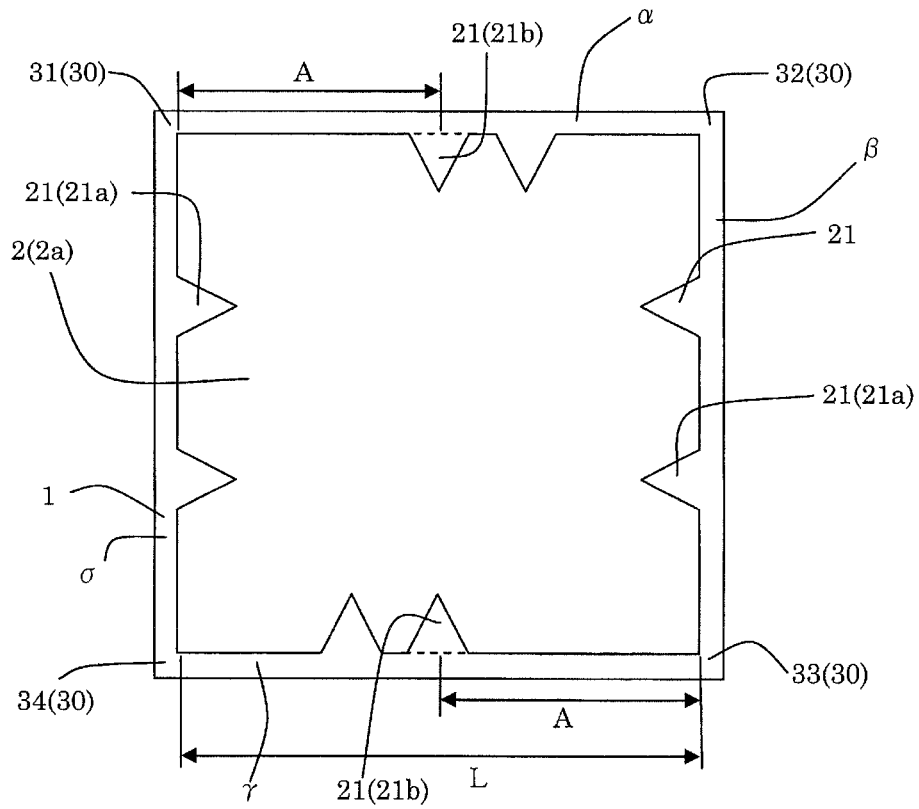
FIG. 4 is a plan view schematically showing an enlarged part of an inflow end face in another embodiment of the honeycomb structure of the present invention.

FIG. 4 shows an example where in a quadrangular cell 2 (a specific cell 2a), two corners constituted to satisfy the relation of Formula (1): $1/(N+1)<A/L$ are present. In the specific cell 2a, in two sides (a first side α and a fourth side σ) extending from a first corner 31 that is one corner, projecting portions 21 are non-uniformly arranged, and in two sides (a second side β and a third side γ) extending from a third corner 33 that is the other corner, the projecting portions 21 are non-uniformly arranged. It is to be noted that the projecting portions 21 (including first projecting portions 21a) other than second projecting portions 21b are arranged at positions to equally divide each side.

FIG. 5 shows an example where in a quadrangular cell 2 (a specific cell 2a), three corners constituted to satisfy the relation of Formula (1): $1/(N+1)<A/L$ are present. In the specific cell 2a, projecting portions 21 are non-uniformly arranged on two sides (a first side α and a fourth side σ) extending from a first corner 31 that is one corner. Furthermore, in the specific cell 2a, the projecting portions 21 are non-uniformly arranged on two sides (the first side α and a second side β) extending from a second corner 32 that is the other corner. Furthermore, in the specific cell 2a, the projecting portions 21 are non-uniformly arranged on two sides (the second side β and a third side γ) extending from a third corner 33 that is the other corner. It is to be noted that the projecting portions 21 (including first projecting portions 21a) other than second projecting portions 21b are arranged at positions to equally divide each side.

FIG. 6 shows an example where in a quadrangular cell 2 (a specific cell 2a), four corners constituted to satisfy the relation of Formula (1): $1/(N+1)<A/L$ are present. In the specific cell 2a, projecting portions 21 are non-uniformly arranged on two sides (a first side α and a fourth side σ) extending from a first corner 31 that is one corner. Furthermore, in the specific cell 2a, the projecting portions 21 are non-uniformly arranged on two sides (the first side α and a second side β) extending from a second corner 32 that is the other corner. Furthermore, in the specific cell 2a, the projecting portions 21 are non-uniformly arranged on two sides (the second side β and a third side γ) extending from a third corner 33 that is the other corner. Additionally, in the specific cell 2a, the projecting portions 21 are non-uniformly arranged on two sides (the third side γ and the fourth side σ) extending from a fourth corner 34 that is the other corner. It is to be noted that the projecting portions 21 (including first projecting portions 21a) other than second projecting portions 21b are arranged at positions to equally divide each side.

It is to be noted that FIG. 7 shows a quadrangular cell 2 that is an example of a specific cell 2a in which a corner constituted to satisfy the relation of Formula (1): $1/(N+1)<A/L$ is present. In the specific cell 2a, projecting portions 21 are non-uniformly arranged on two sides (a second side β and a third side γ) extending from a third corner 33 that is one corner.

The second projecting portion 21b satisfies the relation of Formula (1): $1/(N+1)<A/L$, and there are not any special restrictions on the positions of the first projecting portion 21a as long as a distance from the corner 30 to this projecting portion is shorter than a distance from the corner to the second projecting portion 21b. For example, it is preferable that the position of the first projecting portion 21a is the position to equally divide each side.

The ratio of the total number of the corners (non-uniform corners) constituted to satisfy the relation of Formula (1) to the number of all the corners that are present in the honeycomb structure 100 (the ratio calculated by (the total number of the non-uniform corners/the number of all the corners)× 100) is from 2.5% to 100%. Then, it is preferable that the ratio of the non-uniform corners is from 12.5 to 100% and the corners have the non-uniform arrangement. When the ratio of the non-uniform corners is in the above range, a more suitable exhaust gas purification performance is exerted. When the ratio of the non-uniform corners is less than the above lower limit, the purification performance of the exhaust gas hardly sufficiently improves, and the purification performance runs short.

A thickness of the partition walls 1 is preferably from 0.040 to 0.230 mm and further preferably from 0.040 to 0.178 mm. When the thickness of the partition walls is less than the lower limit, there is the fear that a mechanical strength runs short. When the thickness of the partition walls is in excess of the upper limit, there is the fear that the pressure loss of the honeycomb structure rises. It is to be noted that the thickness of the partition walls is a value obtained by measuring a thickness of a portion in which the projecting portion is not disposed.

There are not any special restrictions on a material of the partition walls 1. For example, it is preferable that the material contains ceramic as a main component. Specifically, it is preferable that the material is at least one selected from the group consisting of silicon carbide, a silicon-silicon carbide based composite material, cordierite, mullite, alumina, aluminum titanate, silicon nitride, and a silicon carbide-cordierite based composite material.

In the cross section of the honeycomb structure of the present invention which is perpendicular to the cell extending direction, the shape of the cell is polygonal. Specifically, examples of the cell shape can include polygonal shapes such as a triangular shape, a quadrangular shape, a pentagonal shape, a hexagonal shape and an octagonal shape, and any combination of the quadrangular shape with the hexagonal shape, the octagonal shape or the like. It is to be noted that in the present description, "the polygonal shape of the cell" is a concept of the shape of the cell including a shape which conforms to the polygonal shape. Furthermore, "the shape of the cell" is defined as a shape in a state where the projecting portions are not disposed. The projecting portion is a portion cut by a plane $F_1$ (see FIG. 3) extended from a surface 1x of the partition wall 1.

In the honeycomb structure of the present invention, it is preferable that cells of 10% or more of the plurality of cells have the corners constituted to satisfy the relation of Formula (1). That is, the ratio of the specific cells to all the cells (the ratio calculated by a numerical formula: (the number of the specific cells/the number of all the cells)×100) is preferably 10% or more and further preferably from 50 to 100%. In this case, the ratio of the specific cells in all the cells is in the above range, and hence, in the honeycomb structure onto which the catalyst is loaded, the more suitable exhaust gas purification performance is exerted. When the ratio of the specific cells in all the cells is less than the above lower limit, the purification performance of the exhaust gas does not sufficiently improve, and there is the fear that the purification performance runs short.

(1-2) Circumferential Wall:

The circumferential wall 20 is a wall disposed to surround the partition walls 1. The circumferential wall 20 may be formed monolithically with the partition walls 1.

A thickness of the circumferential wall 20 is preferably from 0.1 to 6.0 mm and especially preferably from 0.1 to 3.0 mm. When the thickness of the circumferential wall 20 is less than the lower limit, the mechanical strength might deteriorate. When the thickness is in excess of the upper limit, a large space to store the honeycomb structure has to be acquired.

A cell density of the honeycomb structure 100 is preferably from 31 to 155 cells/cm$^2$ and especially preferably from 43 to 148 cells/cm$^2$. When the cell density is less than the lower limit, there is the fear that the strength cannot be kept. When the cell density is in excess of the upper limit, there is the fear that the pressure loss of the honeycomb structure rises.

(2) Manufacturing Method of Honeycomb Structure:

The honeycomb structure of the present invention can be manufactured by a method having a honeycomb forming step and a firing step. Hereinafter, description will be made as to each step.

(2-1) Honeycomb Forming Step:

In the present step, a ceramic forming raw material containing a ceramic raw material is formed, to form a honeycomb formed body having partition walls arranged to define a plurality of cells which form through channels for a fluid.

It is preferable that the ceramic raw material contained in the ceramic forming raw material is at least one selected from the group consisting of a cordierite forming raw material, cordierite, silicon carbide, a silicon-silicon carbide based composite material, mullite, and aluminum titanate. It is to be noted that the cordierite forming raw material is a ceramic raw material blended to obtain a chemical composition in which silica falls in a range of 42 to 56 mass %, alumina falls in a range of 30 to 45 mass %, and magnesia falls in a range of 12 to 16 mass %. Then, the cordierite forming raw material is fired to form cordierite.

Furthermore, the ceramic forming raw material can be prepared by mixing the above ceramic raw material with a dispersing medium, an organic binder, an inorganic binder, a pore former, a surfactant and the like. There are not any special restrictions on a composition ratio of each raw material, and it is preferable to set a composition ratio in accordance with a structure, a material and the like of the honeycomb structure to be prepared.

In the case of forming the ceramic forming raw material, the ceramic forming raw material is initially kneaded to obtain a kneaded material, and the obtained kneaded material is formed in a honeycomb shape. An example of a method of kneading the ceramic raw material to form the kneaded material can include a method of using a kneader, a vacuum pugmill or the like. As a method of forming the kneaded material to obtain a honeycomb formed body, for example, a known forming method such as an extrusion molding or an injection molding is usable.

Specifically, a suitable example of the method can include a method of extruding the material by use of a die to form the honeycomb formed body. As a material of the die, cemented carbide which is hard to be worn is preferable.

It is preferable to use the die prepared as follows. That is, there is initially prepared a die (a conventional die) for use in preparing a heretofore known honeycomb structure which does not have any fins. Afterward, there are formed regions which are complementary to projecting portions (the regions into which the kneaded material enters to form the projecting portions) from slits of this conventional die (gaps to constitute partition walls) toward the outside by a discharge processing. In this way, a predetermined die can be prepared.

By use of such a die, it is possible to simply prepare the honeycomb formed body having projecting portions which satisfy conditions of the honeycomb structure of the present invention.

There are not any special restrictions on a shape of the honeycomb formed body, and examples of the shape include a round pillar shape, an elliptic pillar shape, and a polygonal prismatic columnar shape in which each end face has "a square shape, a rectangular shape, a triangular shape, a pentagonal shape, a hexagonal shape, an octagonal shape or the like".

Furthermore, the obtained honeycomb formed body can be dried after the honeycomb formed body is formed as described above. There are not any special restrictions on a drying method. Examples of the drying method can include a hot air drying, a microwave drying, an induction heating, drying under a reduced pressure, a vacuum drying, and a freeze drying. Among these examples, it is preferable to perform one or any combination of the induction drying, the microwave drying and the hot air drying.

(2-2) Firing Step:

Next, the honeycomb formed body is fired to prepare a honeycomb fired body. The firing of the honeycomb formed body (main firing) is performed for the purpose of sintering and densifying the forming raw material constituting a calcinated honeycomb formed body and acquiring a predetermined strength. Firing conditions (a temperature, a time, atmosphere and the like) vary in accordance with a type of forming raw material, and hence, appropriate conditions may be selected in accordance with the type. For example, when the cordierite forming raw material is used, it is preferable that a firing temperature is from 1410 to 1440° C. Furthermore, it is preferable that the firing time is from 4 to 8 hours as a time to keep the highest temperature. As a device which performs the calcinating and the main firing, an electric furnace, a gas furnace or the like is usable. The honeycomb fired body obtained as described above can be the honeycomb structure of the present invention. It is to be noted that the manufacturing method of the honeycomb structure may further have a circumference coating step as follows.

(2-3) Circumference Coating Step:

In the present step, a circumference of the obtained honeycomb fired body is coated with a circumference coating material to form a circumferential wall. It is to be noted that the circumferential wall may be formed monolithically with the partition walls during the preparation of the honeycomb formed body. The circumferential wall is further formed in the circumference coating step, so that it is possible to prevent the honeycomb structure from being chipped when an external force is applied to the honeycomb structure.

An example of the circumference coating material can include a material obtained by adding additives such as an organic binder, a foamable resin and a dispersing agent to inorganic raw materials such as inorganic fibers, colloidal silica, clay and SiC particles, and adding water to the materials to knead the materials. An example of a coating method with the circumference coating material can include a method of coating "the cut honeycomb fired body" with the material by use of a rubber spatula or the like while rotating the cut honeycomb fired body on a potter's wheel.

EXAMPLES

Hereinafter, the present invention will further specifically be described with reference to examples, but the present invention is not limited to these examples.

Example 1

In Example 1, a forming raw material to prepare a honeycomb structure was initially prepared. Specifically, a binder, a surfactant, a pore former and water were added to a ceramic raw material to obtain a forming raw material. Additionally, as the ceramic raw material, cordierite forming raw materials such as kaolin, talc and alumina were used.

Next, the obtained forming raw material was kneaded with a kneader and then kneaded with a vacuum pugmill, to prepare a kneaded material. Then, the obtained kneaded material was extruded by using a die, to prepare a honeycomb formed body. There was used the die to form the honeycomb formed body having non-uniformly arranged projecting portions (i.e., non-uniform corners). The honeycomb formed body was prepared so that a thickness of partition walls was 0.089 mm and a cell density was 62 cells/cm$^2$ after the honeycomb formed body was fired. A shape of each cell of the honeycomb formed body (the shape of the cell in a cross section perpendicular to an extending direction of the cells) was quadrangular. The honeycomb formed body had a round pillar shape. A diameter of each end face of the round pillar-shaped honeycomb formed body was 118.4 mm after the honeycomb formed body was fired. Additionally, the above die was designed so that the honeycomb structure to be prepared satisfied respective conditions shown in Table 1 and Table 2.

Afterward, the honeycomb formed body was dried, to obtain a honeycomb dried body. During the drying, an induction drying was initially performed, and then, a hot air drying was performed with hot air at a temperature of 120° C. for 2 hours. Next, both end portions of the honeycomb dried body were cut.

Next, the obtained honeycomb dried body was degreased. The degreasing was performed at 450° C. for 5 hours. Then, the degreased honeycomb dried body was fired, to obtain a honeycomb fired body. The firing was performed at 1425° C. in the atmospheric air for 7 hours. Additionally, a temperature was raised from 1200 to 1425° C. in 5 hours. In this way, the honeycomb structure of Example 1 was prepared.

In a cross section of the honeycomb structure of Example 1 which was perpendicular to a cell extending direction, an angle θ of each projecting portion was 45°. Furthermore, a height h of the projecting portion was 0.14 mm. Additionally, a hydraulic diameter of each cell was 1.18 mm, and a ratio of the height of the projecting portion to the hydraulic diameter of the cell was 12%. In addition, the projecting portions were arranged on each side in the cross section perpendicular to the cell extending direction as shown in Table 1. The obtained honeycomb structure had the same shape as an inverted shape of the shape of the above die.

Additionally, the angle θ of the projecting portion and the height h of the projecting portion were measured by using an image measuring instrument ("a compact CNC image measuring system Quick Vision Elf QV ELF" manufactured by Mitutoyo Corporation) and an image analysis software ("QVPAC" manufactured by Mitutoyo Corporation). Furthermore, positions of the projecting portions on each side were confirmed. Specifically, the angle and height h of the projecting portion were measured with the above image measuring instrument.

The angle of the projecting portion was measured as follows. Initially, a straight line parallel to a bottom side F was drawn at a position of ½ of "the height h of the projecting portion", and an intersection point K of this straight line with each of sides (side surfaces) of a triangle excluding the bottom side F was obtained. Afterward, a tangent line to the side surface at the intersection point K was drawn, and an angle formed by the tangent line and the bottom side F was obtained as the angle θ. It is to be noted that "the height h of the projecting portion" is the shortest distance from the highest position of the projecting portion to the bottom side F.

Furthermore, a ratio of a total number of specific cells (i.e., cells in which non-uniform arrangement was present) to a total number of all the cells was 100%. It is to be noted that this ratio is determined in accordance with a structure of the die for use in extrusion, and is optionally changeable in accordance with design of the die. Additionally, in a method of calculating the ratio of the specific cells, the cells in which the non-uniform arrangement was present were confirmed and the total number of the cells having the non-uniform arrangement was counted to measure the total number of the specific cells, by use of the above image measuring instrument and the above image analysis software. At this time, the total number of the cells was also measured. Then, from these values, the ratio of the total number of the specific cells to the total number of the cells in the honeycomb structure was calculated as a percentage.

Additionally, all the specific cells had the same shape. Then, a ratio of the corners in which the non-uniform arrangement was present (a ratio of the non-uniform corners to all the corners) was 25%. This ratio of the corners in which the non-uniform arrangement was present was calculated as follows. Initially, a ratio of the corners in which the non-uniform arrangement was present in one cell was confirmed (e.g., when one of corners of a quadrangular cell was "the corner in which the non-uniform arrangement was present", a ratio was calculated as in the one corner/four corners=0.25). Afterward, this ratio was multiplied by a value of the ratio of the specific cells to all the cells (e.g., this value was "1" when all the cells were the specific cells) to obtain a percentage.

As to the honeycomb structure of Example 1, a partition wall thickness (mm), a porosity (%) of partition walls and a cell density (cells/cm²) were measured by the following methods. The partition wall thickness (mm) and the cell density (cells/cm²) were measured by using the above image measuring instrument and the image analysis software, and the porosity (%) of the partition walls was measured by a mercury porosimetry. Table 1 shows the result. Table 1 shows "the porosity (%) of the partition walls" as "the porosity (%)".

(LA-4 Test)

As to the prepared honeycomb structure, a test based on LA-4 mode of US federal test procedure was carried out as follows. Initially, a catalyst (a three-way catalyst) was loaded as much as 200 g/L onto the partition walls of the honeycomb structure. An aging treatment of the honeycomb structure onto which the catalyst was loaded was carried out at 950° C. for 12 hours by use of an electric furnace. Next, the honeycomb structure onto which the catalyst was loaded was mounted at a position under a floor of a vehicle having a displacement of 2400 cc, to carry out a LA-4 test. In the LA-4 test, a direct modal mass of each exhaust gas component was measured by using an exhaust gas measuring

TABLE 1

|  | Partition wall thickness (mm) | Cell density (cells/cm²) | Porosity (%) | Dia. (mm) | No. of projecting portions per side (N) (projecting portions) | Ratio of height of projecting portion to hydraulic diameter (%) | Angle of projecting portion (degree) |
|---|---|---|---|---|---|---|---|
| Comparative Example 1 | 0.089 | 62 | 35 | 118.4 | 3 | 12 | 45 |
| Comparative Example 2 | 0.089 | 62 | 35 | 118.4 | 3 | 12 | 45 |
| Example 1 | 0.089 | 62 | 35 | 118.4 | 3 | 12 | 45 |
| Example 2 | 0.089 | 62 | 35 | 118.4 | 3 | 12 | 45 |
| Example 3 | 0.089 | 62 | 35 | 118.4 | 3 | 12 | 45 |
| Example 4 | 0.089 | 62 | 35 | 118.4 | 3 | 12 | 45 |
| Example 5 | 0.089 | 62 | 35 | 118.4 | 3 | 12 | 45 |
| Example 6 | 0.089 | 62 | 35 | 118.4 | 3 | 12 | 45 |
| Example 7 | 0.089 | 62 | 35 | 118.4 | 3 | 12 | 45 |
| Example 8 | 0.089 | 62 | 35 | 118.4 | 3 | 12 | 40 |
| Example 9 | 0.089 | 62 | 35 | 118.4 | 3 | 12 | 37 |
| Example 10 | 0.089 | 62 | 35 | 118.4 | 3 | 12 | 70 |
| Example 11 | 0.089 | 62 | 35 | 118.4 | 3 | 12 | 73 |
| Example 12 | 0.089 | 62 | 35 | 118.4 | 3 | 3 | 45 |
| Example 13 | 0.089 | 62 | 35 | 118.4 | 3 | 39 | 45 |
| Example 14 | 0.089 | 62 | 35 | 118.4 | 3 | 42 | 45 |

|  | 1/(N + 1) | Side 1 A/L | Side 2 A/L | Side 3 A/L | Side 4 A/L | Region where projecting portions are arranged | Ratio of non-uniform corners to all corners (%) |
|---|---|---|---|---|---|---|---|
| Comparative Example 1 | 0.25 | 0.25 | 0.25 | 0.25 | 0.25 | — | 0 |
| Comparative Example 2 | 0.25 | 0.30 | 0.25 | 0.25 | 0.25 | Whole region | 1.25 |
| Example 1 | 0.25 | 0.30 | 0.25 | 0.25 | 0.25 | Whole region | 25 |
| Example 2 | 0.25 | 0.30 | 0.25 | 0.30 | 0.25 | Whole region | 50 |
| Example 3 | 0.25 | 0.30 | 0.30 | 0.30 | 0.25 | Whole region | 75 |
| Example 4 | 0.25 | 0.30 | 0.30 | 0.30 | 0.30 | Whole region | 100 |
| Example 5 | 0.25 | 0.30 | 0.25 | 0.25 | 0.25 | Whole region | 12.5 |
| Example 6 | 0.25 | 0.30 | 0.25 | 0.25 | 0.25 | Whole region | 11.25 |
| Example 7 | 0.25 | 0.30 | 0.25 | 0.25 | 0.25 | Whole region | 2.5 |
| Example 8 | 0.25 | 0.30 | 0.25 | 0.25 | 0.25 | Whole region | 2.5 |
| Example 9 | 0.25 | 0.30 | 0.25 | 0.25 | 0.25 | Whole region | 2.5 |
| Example 10 | 0.25 | 0.30 | 0.25 | 0.25 | 0.25 | Whole region | 2.5 |
| Example 11 | 0.25 | 0.30 | 0.25 | 0.25 | 0.25 | Whole region | 2.5 |
| Example 12 | 0.25 | 0.30 | 0.25 | 0.25 | 0.25 | Whole region | 2.5 |
| Example 13 | 0.25 | 0.30 | 0.25 | 0.25 | 0.25 | Whole region | 2.5 |
| Example 14 | 0.25 | 0.30 | 0.25 | 0.25 | 0.25 | Whole region | 2.5 |

Table 1 shows the number of the projecting portions arranged on each side (each of the first side α to a fourth side σ (see FIG. 3)) of the cell in the column of "the number (N) of the projecting portions per side". Furthermore, in Table 1, "the whole region" in the column of "the region where the projecting portions are arranged" indicates "the whole region of a honeycomb structure body", and this "whole region of the honeycomb structure body" means the whole region from a first end face to a second end face of the honeycomb structure body.

device (model No. "MEXA-7400" manufactured by HORIBA, Ltd.). Furthermore, an amount of HC to be emitted as a typical exhaust gas component was measured. Additionally, a space velocity of an exhaust gas in this test was about 10000 (1/hour) (a high flow rate).

Additionally, in the honeycomb structure including the partition walls having the projecting portions, an amount of an exhaust gas to be emitted at a second peak from acceleration especially increases. Consequently, a ratio of a modal mass integrated value between start of the acceleration at the second peak and end of the acceleration at the second peak was calculated, and an increase (%) of the amount of HC to be emitted before and after the second peak from the acceleration was obtained. Table 3 shows the result.

In a column of "arrangement rule 1", "uniform arrangement" indicates that the projecting portions disposed on each side are arranged to equally divide the side. When "the non-uniform arrangement is present in all the cells in which the projecting portions are disposed", it is indicated that the projecting portions are disposed in all the cells, and the non-uniform arrangement is present in all the cells in which the projecting portions are disposed in this manner. When "the non-uniform arrangement is present in cells of 10% of all the cells", it is indicated that the projecting portions are disposed in all the cells, and the non-uniform arrangement is present in the cells of 10% of all the cells.

In a column of "a ratio of cells in which the non-uniform arrangement is present", there is indicated the ratio of the cells (i.e., the specific cells) in which the non-uniform arrangement is present in all the cells in which the projecting portions are disposed.

In a column of "arrangement rule 2", "uniform arrangement" indicates that the projecting portions disposed on each side are arranged to equally divide the side. "Non-uniform arrangement on side 1 only" indicates that the projecting portions only on "the side 1 (the first side $\alpha$)" among all the sides (the first side $\alpha$ to the fourth side $\sigma$) are non-uniformly arranged, and the projecting portions on the other sides (a second side $\beta$ to the fourth side $\sigma$) are arranged uniformly (to equally divide each side). "The non-uniform arrangement on sides 1 and 3" indicates that the projecting portions on "the side 1 (the first side $\alpha$) and the side 3 (a third side $\gamma$)" among all the sides (the first side $\alpha$ to the fourth side $\sigma$) are non-uniformly arranged, and the projecting portions on the other sides (the second side $\beta$ and the fourth side $\sigma$) are arranged uniformly (to equally divide each side). "The non-uniform arrangement on sides 1, 2 and 3" indicates that the projecting portions on "the side 1 (the first side $\alpha$) to the side 3 (the third side $\gamma$)" among all the sides (the first side $\alpha$ to the fourth side $\sigma$) are non-uniformly arranged, and the projecting portions on the other side (the side 4 (the fourth side $\sigma$)) are arranged uniformly (to equally divide the side 4). "The non-uniform arrangement on all the sides" indicates that the projecting portions on all the sides (the first side $\alpha$ to the fourth side $\sigma$) are non-uniformly arranged. Furthermore, in a column of "the number of corners", the number of the non-uniform corners per specific cell is indicated.

In a column of "an increase of an amount of HC to be emitted before and after a second peak in LA-4", the table shows "the increase of the amount of HC to be emitted before and after the second peak from the acceleration".

TABLE 2

| | Arrangement rule 1 | Ratio of cells (specific cells) in which non-uniform arrangement is present (%) | Arrangement rule 2 Arrangement state | Number of corners (corner) |
|---|---|---|---|---|
| Comparative Example 1 | Uniform arrangement | 0 | Uniform arrangement | 0 |
| Comparative Example 2 | Non-uniform arrangement is present in cells of 5% of all cells | 5 | Non-uniform arrangement on side 1 only | 1 |
| Example 1 | Non-uniform arrangement is present in all cells in which projecting portions are disposed | 100 | Non-uniform arrangement on side 1 only | 1 |
| Example 2 | Non-uniform arrangement is present in all cells in which projecting portions are disposed | 100 | Non-uniform arrangement on sides 1 and 3 | 2 |
| Example 3 | Non-uniform arrangement is present in all cells in which projecting portions are disposed | 100 | Non-uniform arrangement on sides 1, 2 and 3 | 3 |
| Example 4 | Non-uniform arrangement is present in all cells in which projecting portions are disposed | 100 | Non-uniform arrangement on all sides | 4 |
| Example 5 | Non-uniform arrangement is present in cells of 50% of all cells | 50 | Non-uniform arrangement on side 1 only | 1 |
| Example 6 | Non-uniform arrangement is present in cells of 45% of all cells | 45 | Non-uniform arrangement on side 1 only | 1 |
| Example 7 | Non-uniform arrangement is present in cells of 10% of all cells | 10 | Non-uniform arrangement on side 1 only | 1 |
| Example 8 | Non-uniform arrangement is present in cells of 10% of all cells | 10 | Non-uniform arrangement on side 1 only | 1 |
| Example 9 | Non-uniform arrangement is present in cells of 10% of all cells | 10 | Non-uniform arrangement on side 1 only | 1 |
| Example 10 | Non-uniform arrangement is present in cells of 10% of all cells | 10 | Non-uniform arrangement on side 1 only | 1 |
| Example 11 | Non-uniform arrangement is present in cells of 10% of all cells | 10 | Non-uniform arrangement on side 1 only | 1 |
| Example 12 | Non-uniform arrangement is present in cells of 10% of all cells | 10 | Non-uniform arrangement on side 1 only | 1 |

TABLE 2-continued

|  | Arrangement rule 1 | Ratio of cells (specific cells) in which non-uniform arrangement is present (%) | Arrangement rule 2 | |
|---|---|---|---|---|
|  |  |  | Arrangement state | Number of corners (corner) |
| Example 13 | Non-uniform arrangement is present in cells of 10% of all cells | 10 | Non-uniform arrangement on side 1 only | 1 |
| Example 14 | Non-uniform arrangement is present in cells of 10% of all cells | 10 | Non-uniform arrangement on side 1 only | 1 |

TABLE 3

|  | Increase of amount of HC to be emitted before and after second peak in LA-4 (%) | Judgment | Pressure loss [kPa] | Ratio of pressure loss to standard structure | Judgment | General judgment |
|---|---|---|---|---|---|---|
| Comparative Example 1 | 37 | Failure | 1.90 | Standard structure | — | — |
| Comparative Example 2 | 36 | Failure | 1.91 | 1.01 | Excellent | Failure |
| Example 1 | 27 | Excellent | 1.92 | 1.01 | Excellent | Excellent |
| Example 2 | 24 | Excellent | 1.94 | 1.02 | Excellent | Excellent |
| Example 3 | 23 | Excellent | 1.96 | 1.03 | Excellent | Excellent |
| Example 4 | 22 | Excellent | 1.98 | 1.04 | Excellent | Excellent |
| Example 5 | 30 | Excellent | 1.92 | 1.01 | Excellent | Excellent |
| Example 6 | 31 | Good | 1.92 | 1.01 | Excellent | Good |
| Example 7 | 33 | Good | 1.91 | 1.01 | Excellent | Good |
| Example 8 | 33 | Good | 2.00 | 1.05 | Excellent | Good |
| Example 9 | 35 | Good | 2.02 | 1.06 | Excellent | Good |
| Example 10 | 33 | Good | 1.72 | 0.91 | Excellent | Good |
| Example 11 | 35 | Good | 1.70 | 0.89 | Excellent | Good |
| Example 12 | 35 | Good | 1.35 | 0.71 | Excellent | Good |
| Example 13 | 33 | Good | 2.45 | 1.29 | Excellent | Good |
| Example 14 | 32 | Good | 2.54 | 1.34 | Good | Good |

(Judgment of LA-4 Test)

The increase (%) of the amount of HC to be emitted before and after the second peak from the acceleration needs to be 35% or less so that the honeycomb structure in which the partition walls have the projecting portions is more advantageous in a bag emission than a honeycomb structure in which the partition walls do not have the projecting portions. Consequently, the LA-4 test was judged on the basis of the following criteria.

Judgment "excellent": A case where the increase of the amount of HC to be emitted is 30% or less is judged to be "excellent".

Judgment "good": A case where the increase of the amount of HC to be emitted is 35% or less and in excess of 30% is judged to be "good".

Judgment "failure": A case where the increase of the amount of HC to be emitted is in excess of 35% is judged to be "failure".

(Judgment of Pressure Loss)

The pressure loss was measured on conditions at a temperature of 25° C., an atmospheric pressure of 1 atm and a gas flow rate of 10 Nm$^3$/min in a wind tunnel test device. The pressure loss was judged on the following criteria. It is to be noted that as to the pressure loss allowed in the honeycomb structure in which the partition walls have the projecting portions, a ratio of pressure loss to a standard structure (a value calculated by a numerical formula: the pressure loss of the honeycomb structure of each of the examples and comparative examples/the pressure loss of the standard structure) needs to be 1.35 or less. Therefore, the following criteria are set.

Judgment "excellent": A case where the ratio of the pressure loss to the standard structure (Comparative Example 1) is 1.3 or less is judged to be "excellent".

Judgment "good": A case where the ratio of the pressure loss to the standard structure (Comparative Example 1) is in excess of 1.3 and 1.35 or less is judged to be "good".

Judgment "failure": A case where the ratio of the pressure loss to the standard structure (Comparative Example 1) is in excess of 1.35 is judged to be "failure".

(General Judgment)

General judgment was carried out in accordance with the following criteria on the basis of the judgment of LA-4 test and the judgment of the pressure loss.

Judgment "excellent": A case where the judgment of the LA-4 test is "excellent" and the judgment of the pressure loss is "excellent" is judged to be "excellent".

Judgment "good": A case where the judgment of the LA-4 test is "excellent" and the judgment of the pressure loss is "good" or a case where the judgment of the LA-4 test is "good" and the judgment of the pressure loss is "excellent" or "good" is judged to be "good".

Judgment "failure": A case where the judgment of the LA-4 test or the judgment of the pressure loss is "failure" is judged to be "failure".

Examples 2 to 14 and Comparative Examples 1 and 2

The procedure of Example 1 was repeated except that projecting portions were arranged as shown in Table 1 and Table 2, to prepare honeycomb structures.

Also as to the honeycomb structures of Examples 2 to 14 and Comparative Examples 1 and 2, the procedure of Example 1 was repeated to measure a partition wall thickness (mm), a porosity (%) of partition walls and a cell density (cells/cm$^2$) and to carry out a LA-4 test and measurement of pressure loss. Table 1 to Table 3 show the results.

(Result)

As shown in Table 3, it is seen that in each of the honeycomb structures of Examples 1 to 14, the projecting portions are non-uniformly arranged, and hence, an exhaust gas purification performance of the honeycomb structure onto which the catalyst is loaded is higher than each of the honeycomb structures of Comparative Examples 1 and 2.

A honeycomb structure of the present invention is utilizable as an exhaust gas purifying catalyst carrier to purify an exhaust gas.

DESCRIPTION OF REFERENCE NUMERALS

1: partition wall, 2: cell, 2a: specific cell, 10: honeycomb structure body, 11: first end face, 12: second end face, 20: circumferential wall, 21: projecting portion, 21a: first projecting portion, 21b: second projecting portion, 21c: the other projecting portions, 30: corner, 31: first corner, 32: second corner, 33: third corner, 34: fourth corner, α: first side, β: second side, γ: third side, and σ: fourth side.

What is claimed is:

1. A honeycomb structure comprising a pillar-shaped honeycomb structure body having porous partition walls arranged to define a plurality of cells extending from a first end face to a second end face to form through channels for a fluid, and a circumferential wall disposed to surround the partition walls, wherein the partition walls have projecting portions projecting to extend into the cells and arranged continuously in an extending direction of the cells, in a cross section perpendicular to an extending direction of the cells, a shape of each cell is polygonal, in the polygonal cell, the projecting portions are disposed on two sides extending from a corner of the cell, respectively, the projecting portion which is disposed on the side having a shorter distance from the corner to the projecting portion in the two sides extending from the corner and which is present at a position closest to the corner is defined as a first projecting portion, the projecting portion which is disposed on the side having a longer distance from the corner to the projecting portion in the two sides extending from the corner and which is present at a position closest to the corner is defined as a second projecting portion, the projecting portions are non-uniformly arranged on the two sides extending from the corner, a length of the side on which the second projecting portion is disposed is defined as L, a distance from the corner to a bottom central position of the second projecting portion is defined as A, the number of the projecting portions disposed on the side on which the second projecting portion is disposed is defined as N, the L, A and N satisfy a relation of Formula (1), and a ratio of a total number of the corners constituted to satisfy the relation of Formula (1) to a total number of the corners of all the cells in the honeycomb structure body is 2.5% or more:

$$1/(N+1) < A/L. \quad \text{Formula (1)}$$

2. The honeycomb structure according to claim 1, wherein in the polygonal cell, at least two corners constituted to satisfy the relation of Formula (1) are present.

3. The honeycomb structure according to claim 1, wherein the cells of 10% or more of the plurality of cells have the corners constituted to satisfy the relation of Formula (1).

4. The honeycomb structure according to claim 1, wherein the number of the projecting portions to be disposed per side constituting a peripheral edge of the cell is 3 or less.

5. The honeycomb structure according to claim 1, wherein the projecting portions are disposed in the whole region of the honeycomb structure body.

* * * * *